United States Patent
Parker et al.

(10) Patent No.: US 6,905,316 B2
(45) Date of Patent: Jun. 14, 2005

(54) TURBINE

(75) Inventors: John Frederick Parker, Huddersfield (GB); Anthony Billington, Huddersfield (GB)

(73) Assignee: Holset Engineering Company, Ltd., Huddersfield (GB)

( * ) Notice: Subject to any disclaimer, the term of this patent is extended or adjusted under 35 U.S.C. 154(b) by 0 days.

(21) Appl. No.: 09/977,804

(22) Filed: Oct. 15, 2001

(65) Prior Publication Data

US 2002/0044875 A1 Apr. 18, 2002

(30) Foreign Application Priority Data

Oct. 13, 2000 (GB) .............................................. 0025248

(51) Int. Cl.[7] .............................. F04B 17/00; F16C 1/24; F02B 33/00
(52) U.S. Cl. ...................... 417/407; 384/398; 123/559.1
(58) Field of Search .......................... 417/407; 384/398, 384/287, 901; 123/559.1; 415/122.1

(56) References Cited

U.S. PATENT DOCUMENTS

| | | | |
|---|---|---|---|
| 3,390,926 A | | 7/1968 | Woollenweber, Jr. |
| 3,811,741 A | * | 5/1974 | McInerney et al. .......... 417/407 |
| 3,961,867 A | | 6/1976 | Woollenweber .............. 417/407 |
| 3,969,804 A | * | 7/1976 | MacInnes et al. ........... 417/407 |
| 3,993,370 A | | 11/1976 | Woollenweber .............. 417/407 |
| 4,204,718 A | * | 5/1980 | Bosco ......................... 384/286 |
| 4,358,253 A | * | 11/1982 | Okano et al. ................ 417/407 |
| 4,427,309 A | * | 1/1984 | Blake .......................... 417/407 |
| 4,622,818 A | | 11/1986 | Flaxington et al. ............ 60/624 |
| 4,624,629 A | | 11/1986 | Murayama et al. .......... 417/407 |
| 4,735,556 A | * | 4/1988 | Fujikake et al. ............. 417/407 |
| 4,738,548 A | * | 4/1988 | Zloch et al. ................. 417/407 |
| 4,902,144 A | * | 2/1990 | Thoren ........................ 384/398 |
| 5,207,566 A | * | 5/1993 | Munkel et al. .............. 417/407 |
| 5,454,646 A | * | 10/1995 | Reisdorf ...................... 417/407 |
| 6,017,184 A | * | 1/2000 | Aguilar et al. ............... 417/407 |
| 6,082,340 A | * | 7/2000 | Heimark ................... 123/559.1 |
| 6,449,950 B1 | * | 9/2002 | Allen et al. .................. 417/407 |

FOREIGN PATENT DOCUMENTS

| | | | |
|---|---|---|---|
| DE | 3936069 | 10/1989 | ............. F02C/7/06 |
| JP | 590047518 | 3/1984 | ................. 384/322 |
| WO | WO 02/203047 A1 * | 3/2002 | ................. 417/407 |

OTHER PUBLICATIONS

Patent Abstracts of Japan, JP 63159620, Okada Masaki, Power Transmitting Mechanism for Power Turbine, Jul. 2, 1988.

Patent Abstracts of Japan, JP 590047518, Kawakami Toshirou et al., Floating Bush Type Slide Bearing, Mar. 17, 1984.

WPI Abstract Accession No. 1991–133914[25], DE 3936069, Stonner, H, Turbocharger Bearing Device, Oct. 28, 1989.

* cited by examiner

*Primary Examiner*—Thai-Ba Trieu
(74) *Attorney, Agent, or Firm*—Barnes & Thornburg

(57) ABSTRACT

A turbocharger in which a drive shaft supports at one end a turbine driven by exhaust gases from an internal combustion engine. The end of the drive shaft remote from the turbine supports a drive connection which is coupled to an output shaft of the driving engine. The shaft is supported in a housing by a first bearing adjacent the turbine and a second bearing adjacent the drive coupling. The first and second bearings each define an inner bearing surface relative to which the shaft rotates and an outer bearing surface which rotates relative to the housing. The first and second bearings are mechanically coupled together such that they rotate relative to the housing at the same speed. Coupling the two bearings together ensures that directional forces applied to the bearing at the end adjacent the drive connection which might cause that bearing to seize are resisted by torque delivered from the bearing at the other end of the shaft.

10 Claims, 2 Drawing Sheets

TURBINE

FIELD OF THE INVENTION

The present invention relates to a turbine, and in particular to a power turbine of the type found in turbocompound engines.

BACKGROUND OF THE INVENTION

A turbocharger comprises a drive shaft one end of which supports a turbine arranged to be driven by exhaust gases from an internal combustion engine. In automotive heavy duty diesel engines turbocharger shafts are supported in a housing usually by two separate floating bearings which are retained in position by circlips or some other conventional mechanical configuration. In a fully floating bearing, the shaft rotates relative to an inner bearing surface defined by a bearing body which also defines an outer bearing surface which itself rotates relative to a surrounding housing. The turbocharger shaft is generally located axially by a separate bearing. In a turbocharger the end of the shaft remote from the turbine simply drives a compressor which is used to deliver air to the engine.

In turbocompound engines, two turbines are provided in series, both driven by the exhaust gases of the engine. One of the turbines drives a compressor to deliver pressurised air to the engine and the other, a power turbine, is used to generate additional power which is transmitted via a mechanical connection. For example, in a power turbine a gear wheel may be fixed to the end of the shaft remote from the turbine and the gear wheel is used to transmit power into an appropriate coupling, for example a fluid coupling or other drive mechanism into the crankshaft of the engine. The power may however be transmitted by other means, for example hydraulically or electrically.

In a power turbine, in which additional power generated is fed back into the crankshaft of the engine via a gear wheel on the turbine shaft, different loadings are applied to the shaft bearing system as compared with loadings in a conventional turbocharger which does no more than drive a compressor. In a conventional turbocharger, out of balance forces and shaft vibration forces are resisted by journal oil films distributed equally around the circumference of the inner and outer bearings as there are no off axis external forces on the system. In a power turbine in contrast, the gear drive supported on the end of the shaft remote from the turbine generates a reaction force which gives rise to an external directional force on the turbine shaft. This external force significantly increases the load, particularly on the bearing closest to the gear. As a result conventional floating bearing arrangements are not suitable for use at the gear end (or other drive connection) of a power turbine. This is because load carrying oil films in fully floating bearings require relative rotation at both the inner and outer bearing surfaces. However, the directional load at the gear end of the shaft causes the shaft to be displaced such that the oil film on the side of the bearing opposite the applied force can become very thin. At high power transmission levels, the directional load can become so great that, in the limit, the floating bearing stops rotating within the housing. As a result, the load carrying capacity of the bearing drops and failure of the shaft bearing system can occur. Consequently conventional power turbines have some form of fixed bearing arrangement at the drive connection and of the shaft, typically a ball bearing assembly.

It is an object of the present invention to obviate or mitigate the problems outlined above.

SUMMARY OF THE INVENTION

According to the present invention, there is provided a turbocharger comprising a drive shaft supporting at one end a turbine arranged in use to be driven by exhaust gases from an internal combustion engine and supporting at the other end a drive connection which in use is coupled to an output shaft of the engine, wherein the shaft is supported in a housing by a first bearing adjacent to the turbine and a second bearing adjacent the drive connection, the first and second bearings each define an inner bearing surface relative to which the shaft rotates and an outer bearing surface which rotates relative to the housing, and the first and second bearings are mechanically coupled together such that they rotate relative to the housing at the same speed.

In embodiments of the present invention, the driving effect of the bearing adjacent the turbine end of the shaft is used to maintain the rotational speed of the more highly directionally loaded gear at the other end of the shaft. As a result, when high gear loads are applied to the shaft, the bearing at the end of the shaft remote from the turbine is prevented from slowing and losing load carrying capacity by driving torque which is delivered from the less directionally loaded bearing at the end of the shaft adjacent the turbine.

The driving effect at the gear end of the bearing is produced by modifying the relative surface areas and operating clearances of the inner and outer oil films, and by the areas of the bearing end faces abutting the shaft shoulders.

Preferably the first and second bearings are formed from a single tubular body through which the shaft extends. Such an approach is attractive from the point of view of ease of manufacture and for this reason single piece floating bearings have been used as a low cost bearing arrangements in some small turbocharges. There has however been no previous recognition of the high load bearing possibilities of one piece floating bearings which would suggest the use of such bearings in power turbines in accordance with the present invention.

It is also possible to provide a multi-part bearing assembly in which the first and second bearings are interconnected by a separate tube through which the shaft extends. The separate tube could be locked against rotation relative to the bearings by any appropriate means, for example interlocking castellations.

Radial apertures may be provided in the bearing assembly to provide oil drainage passageways. The first and second bearings may define axially-facing end surfaces which bear against retaining shoulders, the radial thicknesses of the end surfaces being equal or less than the radial spacing between the inner and outer bearing surfaces.

BRIEF DESCRIPTION OF THE DRAWINGS

An embodiment of the present invention will now be described, by way of example, with reference to the accompanying drawings, in which.

DETAILED DESCRIPTION OF THE PREFERRED EMBODIMENTS

Figure 1:
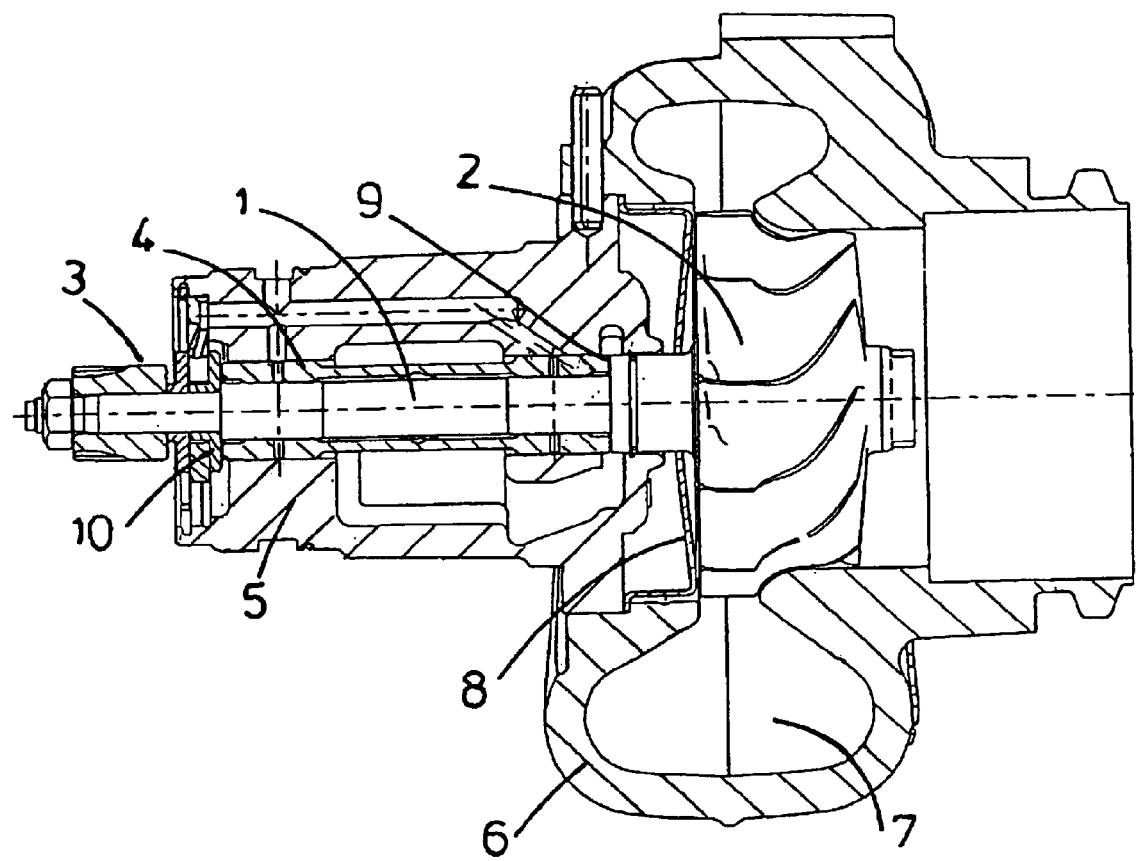
FIG. 1 is a sectional view through a turbocharger in accordance with the present invention.

Referring to FIG. 1, the illustrated turbocharger comprises a shaft 1 which supports at one end a turbine 2 and supports at the other end a drive gear 3. The shaft 1 is supported in a one piece tubular bearing 4 which is supported within a housing 5. The housing 5 is secured to a body 6 which defines a volute 7 through which exhaust gases delivered from an internal combustion engine pass to apply torque to the turbine 2. A heat shield 8 protects the bearing assembly from the hot gases which drive the turbine 2.

One end of the bearing 4 abuts a shoulder 9 defined by the shaft whereas the other end of the bearing 4 abuts a flange 10 which forms part of a thrust bearing which maintains the axial position of both the bearing 4 and the shaft 1. Flange 10 is part of an integral sleeve 11a telescoped over an integral extension 1a of shaft 1. A second flange 10a is also telescoped over extension 1a, as is the gear 3. A nut 3a sandwiches gear 3 and flanges 10, 10a to capture, with appropriate axial clearance, a thrust bearing plate 4a which limits axial excursions of the shaft 1 and turbine 2. The thrust bearing plate is supplied with pressurized oil from main oil drilling 5a which receives suitable pressurized oil through an inlet 5b. Internal passage 4b allows pressurized oil from oil drilling 5a to provide a film between thrust bearing plate 4a and adjacent flanges 10 and 10a. The structure of the bearing 4 is shown in greater detail in FIGS. 2 to 5.

Referring to FIGS. 2 to 5, the bearing 4 defines a first bearing having an inner bearing surface 11 and an outer bearing surface 12 and a second bearing having an inner bearing surface 13 and an outer bearing surface 14. There is a clearance between the outer bearing surfaces 12, 14 and the housing 5. The surfaces 11, 12, 13 and 14 are defined at the ends of a tubular body having a central section 15 the inner and outer diameters of which are more and less than the diameters of the inner bearing surfaces 11, 13 and the outer bearing surfaces 12, 14, respectively. Passageways 16a connects oil drilling 5a with oil passageways 16 which extend between the inner and outer bearing surfaces. Pressurized oil from oil drilling 5a provides a film of oil between bearing surfaces 12, 14 and the housing 5 and between bearing surfaces 11, 13 and shaft 1. Oil drainage apertures 17 are provided in the central section 15 to ensure that oil can drain freely from the inner bearing surfaces. Axial ends 18 of the tubular bearing structure have the same outer diameters as the outer bearing surfaces 12, 14 and greater internal diameters than the inner bearing surfaces 11, 13.

Given that the bearing 4 is formed in one piece, the bearings defined at opposite ends thereof must rotate at the same speed. Thus the rotational speed of the bearing surfaces supporting the end of the shaft adjacent the gear 3 must be the same as the rotational speed of the bearing surfaces supporting the end of the shaft adjacent the turbine 2. Thus high loads at the end of the shaft adjacent the gear 3 are prevented from slowing down and thereby reducing the load carrying capacity of the adjacent bearing surfaces.

In the illustrated example the bearing 4 is made from a single component. The central section 15 of this single component has an internal diameter greater than that of the turbocharger shaft and an external diameter less than that of the adjacent housing so as to avoid hydrodynamnic drag resisting rotation of the shaft. This may not, however, be necessary in all embodiments of the invention. Rather, the proportions of the central section 15 of the bearing may be varied in order to give the correct hydrodroynamic force balance on the bearing. For example, it may not be necessary to provide a recess along the inner diameter in order to maximise the bearing speed. Thus, in alternative embodiments of the invention the inner diameter of the central section 15 may be smaller or larger than that illustrated and for instance may be equal to the diameter of the surfaces 11 and 13. Similarly, the outer diameter of the central section 15 may be smaller or larger than illustrated and may for instance be equal to the diameter of the surfaces 12 and 14.

The radial thickness of the end portions of the bearing body 4 which define the surfaces 18 can also be adjusted as necessary to modify the area of the end faces 18 to ensure suitable rotational speeds for the bearing body 4. For instance, the axial ends 18 of the tubular bearing structure may have outer diameters which are smaller than the diameter of the outer bearing surfaces 12 and 14 and internal diameters which are equal to the inner bearing surfaces 11 and 13.

Rather than forming the bearing 4 as a one-piece tube, the bearing could be in the form of two separate bearings linked by a tube arranged to engage the bearings such that the two bearings are constrained to rotate at the same speed.

It would be possible to axially locate the bearing 4 using circlips or the like but the use of such devices can be avoided as shown in the illustrated embodiment by arranging for the bearing 4 to bear axially against the shoulder 9 on the turbine shaft and against the thrust bearing flange 10 at the gear end of the shaft.

Figure 2:
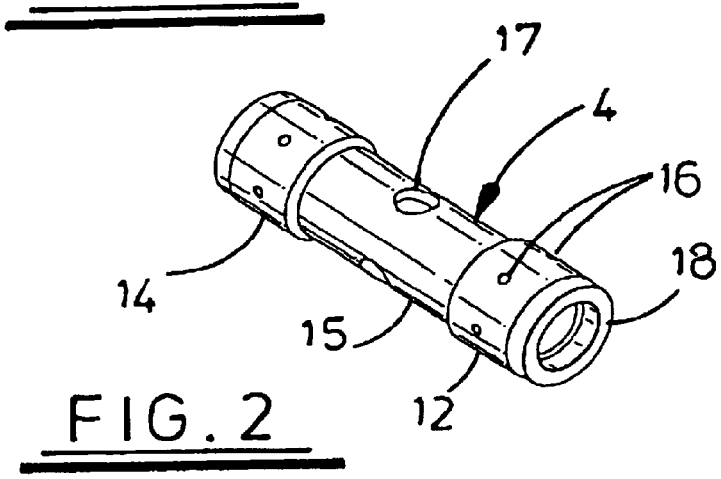
FIG. 2 is a perspective view of a one-part bearing incorporated in the turbocharger of FIG. 1.
Figure 3:
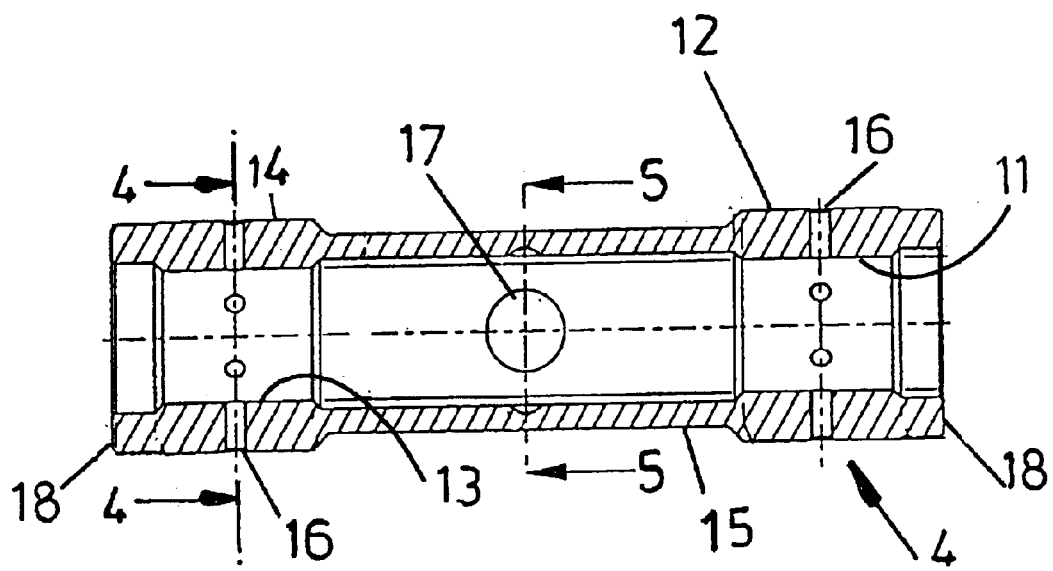
FIG. 3 is an axial section through the bearing of FIG. 2.
Figure 6:
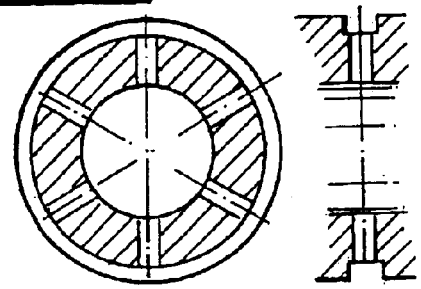
FIG. 6 is a section showing one possible modification of the bearing of FIG. 2.
Figure 4:
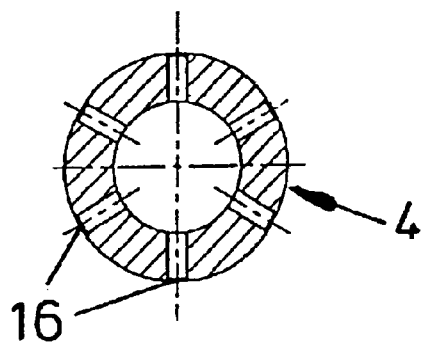
FIG. 4 is a section on the line 4—4 of FIG. 3.
Figure 5:
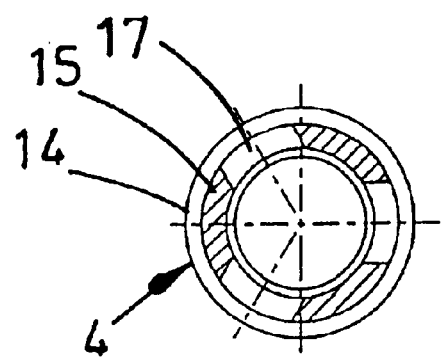
FIG. 5 is section on the line 5—5 of FIG. 3.

A further possible modification of the bearing of FIG. 2 is illustrated in FIG. 6 which is a cross-section corresponding to the section taken on the line 4—4 of FIG. 2 but of a modified bearing in which an annular groove 19 is provided in the outer surface of the bearing. The groove 19 links the openings of the oil passageways 16 and ensures that the oil supply holes in the housing 5 from which oil is supplied to the bearing are never blocked.

Having thus described the invention, what is claimed as novel and desired to be secured by Letters Patent of the United States is:

1. A power turbine comprising a drive shaft supporting at one end a turbine arranged in use to be driven by exhaust gases from an internal combustion engine and supporting at the other end a drive connection which in use is coupled to a load demand of the internal combustion engine, wherein the shaft is supported in a housing by a first floating bearing adjacent to the turbine and a second floating bearing adjacent the drive connection, the first and second bearings each defining an inner bearing surface relative to which the shaft rotates and an outer bearing surface which rotates relative to the housing, and the first and second bearings are mechanically coupled together such that said first and second bearings are constrained to rotate relative to the housing at the same speed.

2. The power turbine according to claim 1, wherein the first and second bearings are formed from a single tubular body through which the shaft extends.

3. The power turbine according to claim 1, wherein the first and second bearings are separate components interconnected by a tubular body through which the shaft extends.

4. The power turbine according to claim 1, wherein the tubular body defines radial apertures to provide oil drainage passage ways.

5. The power turbine according to claim 4, wherein said housing has passageways formed therein for connecting a supply of pressurized lubricant to said first and second bearings.

6. The power turbine according to claim 1, wherein the first and second bearings define axially-facing end surfaces which bear against retaining shoulders, the radial thickness of the end surfaces being less than or equal to the radial spacing between the inner and outer bearing surfaces.

7. The power turbine according to claim 6, wherein said drive shaft has a shoulder against which one of said axially-facing end surfaces is positioned, said power turbine further comprising means for forming a thrust bearing adjacent the other of said axially-facing end surfaces, whereby the axial excursions of said shaft are restrained.

8. The power turbine according to claim 7, wherein said housing has passageways formed therein for connecting a supply of pressurized lubricant to said thrust bearing means.

9. The power turbine according to claim 8, wherein said housing has passageways formed therein for connecting a supply of pressurized lubricant to said first and second bearings.

10. The power turbine according to claim 9, wherein said housing has a common passageway for connecting a supply of pressurized lubricant to said thrust bearing means and to said first and second bearings.

* * * * *